No. 751,121. PATENTED FEB. 2, 1904.
C. H. TIDEY.
AUTOMATIC GAGE.
APPLICATION FILED JUNE 22, 1903.
NO MODEL.

Witnesses
Edward R. Monroe.
Georgiana Chace

Inventor
Charles Henry Tidey
By Luther V. Moulton
Attorney

No. 751,121. Patented February 2, 1904.

UNITED STATES PATENT OFFICE.

CHARLES HENRY TIDEY, OF NEWARK, NEW JERSEY.

AUTOMATIC GAGE.

SPECIFICATION forming part of Letters Patent No. 751,121, dated February 2, 1904.

Application filed June 22, 1903. Serial No. 162,686. (No model.)

*To all whom it may concern:*

Be it known that I, CHARLES HENRY TIDEY, a citizen of the United States, residing at Newark, in the county of Essex and State of New Jersey, have invented new and useful Improvements in Automatic Gages, of which the following is a specification.

My invention relates to improvements in automatic gages, and more especially to such gages for adjusting lumber relative to a saw and for analogous purposes; and its object is to provide a gage having a series of automatically-operative stops or gages to engage the end of the lumber and each adjustable toward and from the saw to determine the length of the piece to be cut off the lumber and a series of brackets to support and adjust these gages and to also adjust the angle of the lumber relative to the saw, to provide a simple and readily-adjusted device, and to provide the same with various new and useful features hereinafter more fully described, and particularly pointed out in the claims.

My invention consists, essentially, of the combination and arrangement of a series of adjustable brackets mounted on a suitable support, a series of stops or gages movably mounted on said brackets, and means for automatically moving said gages into position to engage the end of the lumber, and in various features of construction and operation hereinafter more fully described, and particularly pointed out in the claims, reference being had to the accompanying drawings, in which—

Figure 1:
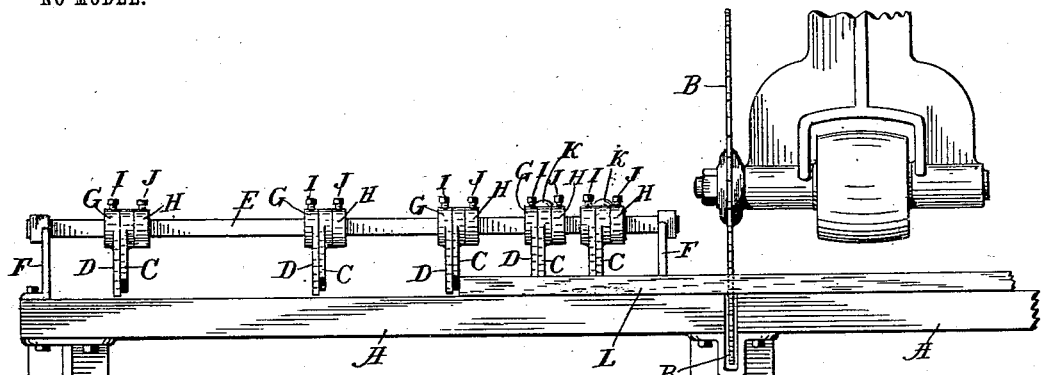
Figure 2:
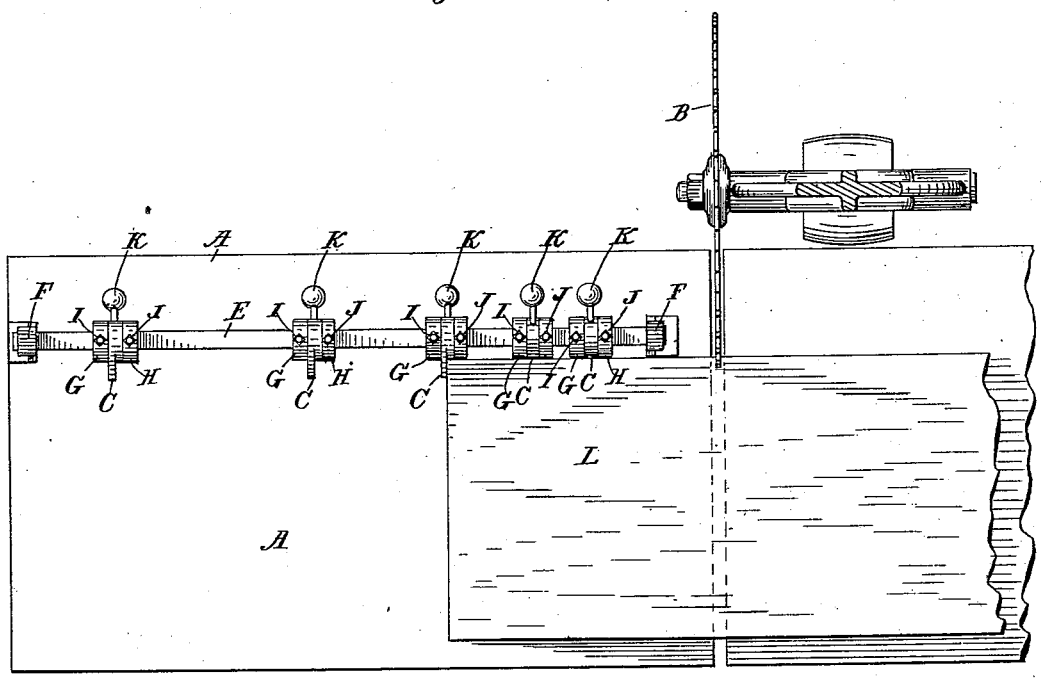
Figure 3:
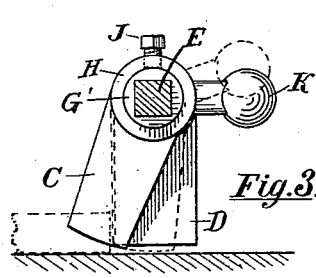
Figure 4:
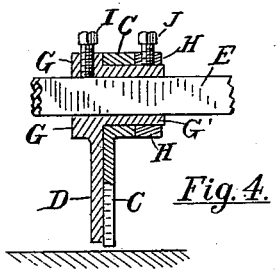

Figure 1 is a front elevation of a device embodying my invention; Fig. 2, a plan view of the same; Fig. 3, an enlarged detail of a gage and bracket in side elevation, and Fig. 4 the same in front elevation with parts broken away to vertical plane.

Like letters refer to like parts in all of the figures.

A represents any suitable table to support the lumber.

B represents an ordinary swing-saw for cutting off the lumber, which lumber is represented at L.

Mounted upon the table A and in suitable posts F is a support for the brackets and consisting of a rod or bar E, which is preferably square in cross-section to prevent the brackets from turning thereon. A series of stops or gages C are provided, each of which is movably mounted on a corresponding bracket D in any convenient manner, preferably pivoted thereon, each bracket being adjustable longitudinally of the rod E and mounted thereon by means of a sleeve G, surrounding the rod E and slidable thereon, said sleeves also having a square opening to receive said rod and prevent turning of the bracket thereon. Each gage is preferably mounted on the respective bracket by being journaled on the sleeve G and retained thereon by a collar H, secured by a set-screw J. Each bracket is also secured in adjusted position on the rod by a set-screw I. To turn the gages C on their pivots and project their lower ends forward or outward from the brackets and in position to engage the end of the lumber, each gage is provided with a weight K, mounted on an arm projecting rearward from the gage, as in Fig. 3. Each gage will thus automatically move to operative position when released and when engaged by the rear edge of the lumber will move backward until the lumber is stopped by engagement with the brackets.

It will be noted that each bracket supports a gage, and by adjusting the respective brackets on the rods the gages are respectively adjusted toward and from the saw. It is also obvious that the particular movable connection between the bracket and gage may be varied in location or character without materially affecting the operation of the device. I have shown a swinging cut-off saw and a fixed table, on which table the gage is mounted; but it is obvious that the device may be mounted on a movable table and used with a stationary saw and can also be used in various other relations besides with saws and saw-tables. It is also obvious that various modifications of the structure and of its details may be adopted without departing from the spirit of my invention. I do not, therefore, limit myself to the precise construction shown; but

What I claim, and desire to secure by Letters Patent, is—

1. In an automatic gage, a series of adjustable brackets, and a corresponding series of gages supported on said brackets and movable relative thereto, and also adjusted thereby.

2. In an automatic gage, a support, brackets adjustable longitudinally of said support and adapted to adjust lumber laterally, and gages supported on said brackets and movable thereon, and adapted to engage the end of the lumber and adjust the same longitudinally.

3. In an automatic gage, a rod, brackets adjustable longitudinally of said rod and non-rotative thereon, and gages pivoted on said brackets and adapted to swing forward of the plane of said brackets.

4. In an automatic gage, a series of adjustable brackets, a corresponding series of gages pivoted on said brackets, and means for automatically adjusting the gages about the axis of their pivots.

5. In an automatic gage, a rod, brackets non-rotative on said rod and longitudinally adjustable thereon, gages pivoted on said brackets, and means for automatically adjusting said gages on their pivots.

6. In an automatic gage, a rod, brackets having sleeves adjustable on said rod, gages journaled on the sleeves and means for automatically adjusting the gages about the axis of the sleeves.

7. An automatic gage comprising a square rod, brackets having sleeves provided with square openings to receive the rod, and adjustable on the rod, gages journaled on the sleeves, and means for automatically adjusting the gages about the axis of the sleeves.

8. An automatic gage comprising a square rod, brackets having sleeves provided with square openings to receive the rod and horizontally adjustable on the rod, gages journaled on the sleeves, and weights attached to the gages.

In testimony whereof I have hereunto set my hand in presence of two subscribing witnesses.

CHARLES HENRY TIDEY.

Witnesses:
  MORRIS B. DRAPER,
  EDWARD TAGGART.